United States Patent [19]

Macrander

[11] 3,781,484

[45] Dec. 25, 1973

[54] PATH SELECTION TECHNIQUE FOR ELECTRONIC SWITCHING NETWORK

[75] Inventor: Max S. Macrander, Warrenville, Ill.

[73] Assignee: GTE Automatic Electric Laboratories Incorporated, Northlake, Ill.

[22] Filed: Dec. 23, 1971

[21] Appl. No.: 211,500

[52] U.S. Cl. .......................... 179/18 GF, 340/166 R

[51] Int. Cl. .............................................. H04q 3/50

[58] Field of Search ................ 179/18 GF; 340/166; 307/248, 299

[56] References Cited

UNITED STATES PATENTS

| | | | |
|---|---|---|---|
| 3,688,051 | 8/1972 | Aagaard | 179/186 F |
| 3,531,773 | 9/1970 | Beebe | 340/166 R |
| 3,407,315 | 10/1968 | Greefkes | 307/248 |

OTHER PUBLICATIONS

GE Transistor Manual, R. E Belke et al., Seventh Edition, 1964, pages 406 & 407, FIGS. 16, 19I and 16.19J

*Primary Examiner*—Thomas W. Brown
*Attorney*—K. Mullerheim et al.

[57] ABSTRACT

A switching circuit using crosspoint switching elements including a four terminal pnpn semiconductor device such as a thyristor, a cathode terminal for connection to an information signal line, an anode terminal for connection to another signal line and P(−) and P(+) terminals for receiving control signals to interconnect the information signal lines through the crosspoint switching element, and means for biasing the cathode terminal negative with respect to ground and for biasing the anode terminal at ground potential, thereby eliminating extra voltage sources required in such prior art crosspoint switching elements and decreasing the amount of the normally required gate current.

9 Claims, 4 Drawing Figures

PATH SELECTION TECHNIQUE FOR ELECTRONIC SWITCHING NETWORK

This invention relates to electronic switching networks for interconnecting information signal lines, and in particular to improvements in such switching networks utilizing crosspoint switching circuits.

In electronic switching networks, it is extremely advantageous to employ four terminal pnpn elements instead of two and three terminal elements at the information crosspoint circuits since they provide very good isolation between the control and the information signal paths. Such four terminal pnpn crosspoint elements also simplify the logic required for performing the various path interconnections required.

These conventional crosspoint circuits include a four terminal pnpn semiconductor device having anode and cathode terminals, and P (−) and P(+) terminals. Reference may be made to FIGS. 1–3 herein which illustrate conventional crosspoint circuits employing such four terminal pnpn crosspoint devices.

Normally, a positive voltage (below the forward breakover value) is connected to the crosspoint anode, and ground or near ground potential is supplied at the crosspoint cathode. Crosspoint selection is accomplished through simultaneous application of a positively directed selection pulse at the P(+) terminal and a negatively directed selection pulse at the P(−) terminal, such pulses normally being supplied through TTL logic. The purpose of such selection pulses is to cause a current to be injected into the gate element of the crosspoint semiconductor device thereby causing the crosspoint to turn on and interconnect the information signal lines normally connected to the anode and cathode terminals.

A disadvantage of this prior technique is that it is necessary to offset the potential at the P(−) terminal by a few volts above the potential at the cathode in order to make injection of the gate current possible. This requires extra components, such as for example a Zener diode or an extra offset voltage source to be used at the P(−) terminal. In prior art electronic switching networks utilizing four terminal pnpn crosspoints, both the P(−) and the P(+) terminal are offset by a small voltage, such as +5 volts, in order to prevent marginal operation in the event only the P(−) terminal was offset.

Two additional disadvantages have been found using the prior art crosspoint cricuits. An undesirably high amount of gate current must be used to turn the device on due to the low collector voltage of the gate driving transistor(s) and associated low current transport efficiency. Secondly, use of the prior art scheme in a telephone switching network further complicates matters since the positive voltage required at the anode of the crosspoints is usually not available in telephone central offices since the positive battery terminal there is grounded.

SUMMARY OF THE INVENTION

In accordance with the principles of the present invention, a switching network or circuit using four terminal pnpn crosspoint elements is provided without the need for extra components or voltage sources to offset the potential of the P(−) terminal above the cathode potential. As will be herein described, the cathode terminal is biased negative with respect to ground and the anode terminal is biased at ground potential. This automatically provides more than the minimum required negative offset voltage between the P(−) terminal and the cathode if the P(−) terminal is kept at ground lever during the selection or pulling operation. An additional advantage of the present invention is that it provides the gate driving transistor with a substantially larger collector to base voltage and hence increases collector efficiency of this transistor thereby significantly decreasing the gate current required in the prior art scheme.

DETAILED DESCRIPTION

Figure 1:
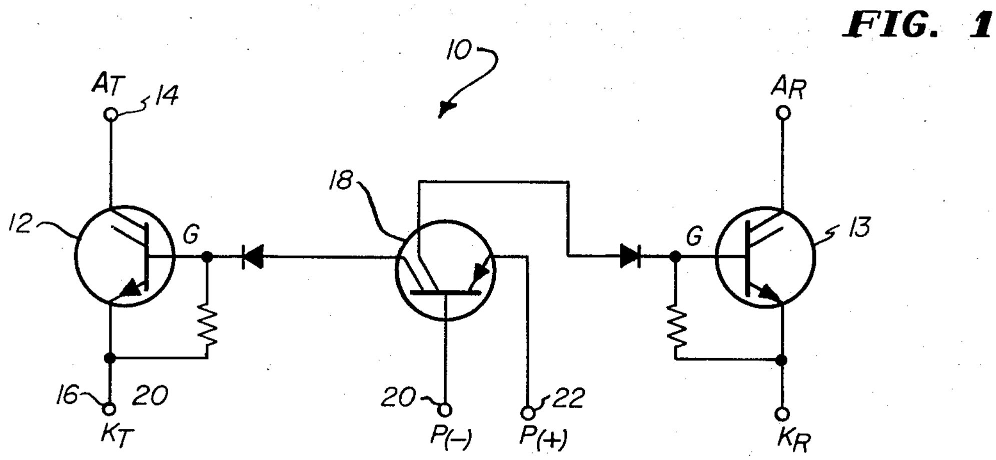
FIGS. 1 – 3 are schematic diagrams illustrating the use of crosspoint circuits including four terminal pnpn semiconductor devices in various selection schemes -- FIG. 1 illustrating a high voltage crosspoint, FIG. 2 illustrating an alternative crosspoint circuit and FIG. 3 illustrating an unbalanced crosspoint circuit.
Figure 2:
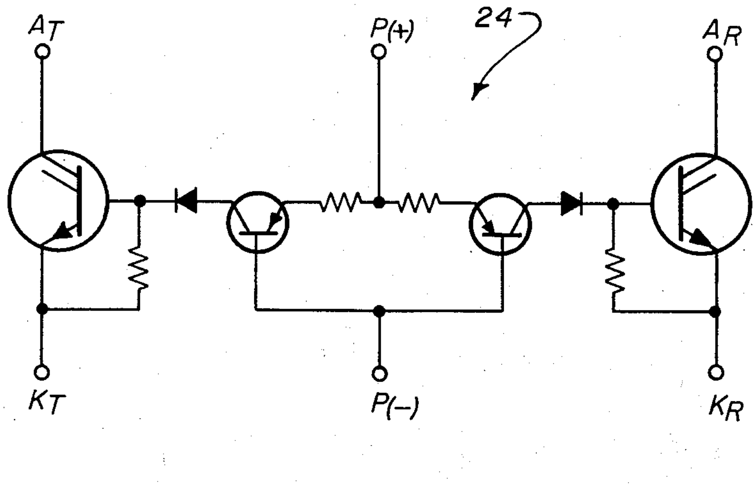
Figure 3:
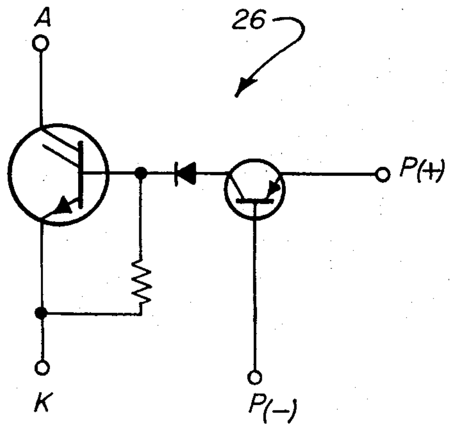

FIGS. 1 – 3 are schematic diagrams of various alternative crosspoint devices useful in electronic switching networks for interconnecting a plurality of information signal lines. The crosspoint device 10 shown in FIG. 1 is normally utilized in high voltage crosspoint situations, and includes four terminal pnpn semiconductor devices 12 and 13, such as thyristors, each having an anode element connected to anode terminal 14; a cathode element connected to cathode terminal 16 and a gate element (G). A gate driving double collector transistor 18 includes a base element connected to a P(−) terminal 20 and an emitter element connected to a P(+) terminal 22. As shown in FIG. 1, the cross-point device 10 is utilized in a balanced switching scheme so that one collector element of transistor 18 is coupled to the gate element of pnpn device 12 and the other collector element is coupled to the gate element of pnpn device 13.

When the crosspoint device 10 is utilized in an electronic switching network, the anode terminal 14 is connected to one information line and the cathode terminal 16 is connected to another information line, the information lines being selectively coupled through the pnpn device 12 when selectively operated by suitable pulses supplied to the P(−) and P(+) terminals 20, 22. A similar connection is made between two other information signal lines through the pnpn device 13 on the other half of the balanced network.

FIG. 2 illustrates still another cross-point device 24 in a balanced switching arrangement with the information signal lines at the crosspoint selectively intercoupled by suitable application of control pulses to the P(−) and P (+) terminals. The illustrated crosspoint devices 10 and 24 are normally available as integrated circuits with the indicated terminals for coupling the information signal lines and the appropriate control signals thereto.

FIG. 3 illustrates still another crosspoint circuit 26 useful in unbalanced systems where information signal lines connected to the anode and cathode of the pnpn device can be selected by appropriate control signal applied to the indicated P(−) and P(+) terminals.

As previously described, in prior art switching networks employing such crosspoint circuits, it is necessary to offset the potential at the P(−) terminal by a few volts above the cathode potential of the pnpn device in order to enable injection of gate current from the gating device.

Figure 4:
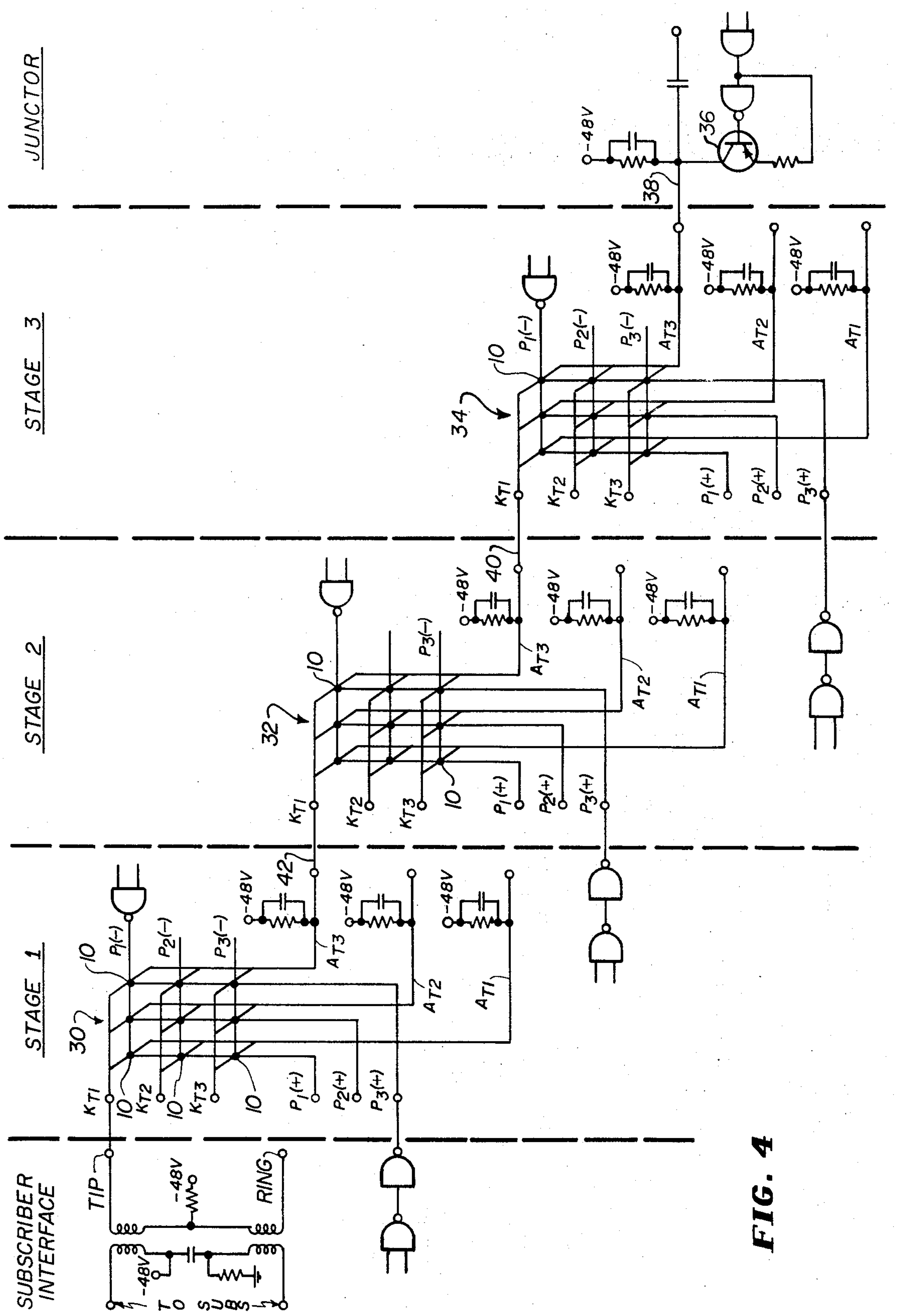
FIG. 4 illustrates a switching circuit including a plurality of four terminal pnpn crosspoint devices connected for operation in accordance with the principles of the present invention.

FIG. 4 illustrates a schematic diagram of an electronic switching network utilizing a crosspoint circuit including a four terminal pnpn semiconductor device without the need of any offset voltage sources. The switching network shown in FIG. 4 is illustrated in connection with a telephone switching system, although it is to be understood that the principles herein can apply to any electronic switching network. The illustrated switching network consists of stages 1 – 3 for interconnecting a subscriber interface to a junctor. Each of the stages 1 – 3 includes a 3 × 3 array 30 of crosspoint circuits, such as for instance the crosspoint circuit 10 illustrated in FIG. 1. Thus, for instance in stage 1 a crosspoint circuit 10 is present at nine crosspoint locations, which have been represented by the heavy dots in the stage 1, array 30 portion of FIG. 4. The anode, cathode, and the P(+) and P(−) terminals for each crosspoint also have been labeled in each stage of FIG. 4. For instance, the terminals associated with the righthand topmost crosspoint are cathode terminal $K_{T1}$, anode terminal $A_{T3}$, and control signal terminals $P_{1(-)}$ and $P_{3\,(+)}$.

For convenience, only the drive elements required for describing the selection of the right hand, topmost crosspoint in stages 1 – 3 are shown in FIG. 4, it being understood that similar drive elements are as well provided for the remaining crosspoints in the switching network.

At the junctor portion of FIG. 4, there is illustrated a transistor 36 which is normally biased in the off condition. Thus, both the cathode terminal $K_{T1}$ and the anode terminal $A_{T3}$ of the crosspoint in array 34 of stage 3 are connected to −48 volts. When the junctor is selected, a flip-flop therein is selected (not shown) which remains on, and through the two TTL gates shown connected to the base element of transistor 36, forward biases the transistor 36 into saturation, thus coupling point 38 connected to the collector of transistor 36 very close to ground potential.

Thus, immediately before selection of the required crosspoint, the associated anode terminal $A_{T3}$ is connected to approximately ground potential so that the pnpn device is ready for operation with its cathode at −48 volts and its anode at close to ground potential. As noted in FIG. 4 the terminal $A_{T3}$ is multiplexed to all of the three pnpn devices of the crosspoints 10 on the far right hand column of the array 34. Similarly, the terminal $K_{T1}$ is multiplexed to all of the cathode terminals of the pnpn devices associated with the crosspoints 10 located at the topmost row of the matrix 34. However selection of the particular crosspoint 10 at the righthand, topmost portion of matrix 34 can be accomplished by coupling suitable control signals through terminals $P_{1\,(-)}$ and $P_{3\,(+)}$ from the indicated TTL logic circuits connected thereto. Such TTL logic circuits normally supply a pull-up pulse from ground to +3 volts and a pull-down pulse from +3 volts to ground. Therefore, during selection of the righthand, topmost crosspoint 10 of the matrix 34 in stage 3, terminal $P_{1\,(-)}$ is pulled down from a+3 volts to ground while simultaneously the $P_{3(+)}$ terminal is raised from ground to + 3 volts.

This operation turns the selected crosspoint on so as to connect terminal $K_{T1}$ in stage 3 through anode $A_{T3}$ to point 38 which is at close to ground potential. This same selection operation which has been described in connection with stage 3 simultaneously occurs in stages 2 and 1. Point 40 which was coupled to ground by crosspoint 10 of matrix 34 also couples ground potential to point 42 in stage 1, and through cross-point 10 to $K_{T1}$ of matrix 30 of stage 1. In other words, the required P(+) and P(−) control signals for selecting the righthand, topmost cross-point 10 in each of stages 1–3 are simultaneously applied thereto so that in rapid succession the respective crosspoints selected in stages 3, then 2, and then 1 are connected to ground. The connection is finally made to the Tip terminal at the subscriber interface. It is to be understood that FIG. 4 only illustrates one-half of the balanced system and therefore a similar connection is made from the junctor to the Ring terminal at the subscriber interface.

It must be particularly noted that in the illustrated embodiment of the invention in connection with a telephone switching network, no extra offset voltages are required, and there is no need for a positive five volt source as required in prior art switching networks utilizing crosspoint circuits having four terminal pnpn semiconductor devices. While the principles of the present invention have been described and illustrated in connection with a telephone switching network, the application thereof can readily be made to other switching networks whenever it is desired to interconnect two or more information signal lines under the selection of suitable control signals.

The foregoing detailed description has been given for clearness of understanding only, and no unnecessary limitations should be understood therefrom, as modifications will be obvious to those skilled in the art.

What is claimed is:

1. In a switching circuit including a plurality of crosspoint switching elements for selectively interconnecting respective information signal lines, each of said crosspoint switching elements having a four terminal semiconductor device and including a terminal (K) for connection to one of said information signal lines, a terminal (A) for connection to another of said information signal lines, and terminals P(−) and P(+)) for receiving control signals for selection of respective crosspoint switching elements to interconnect the associated information signal lines, the improvement comprising:

first circuit means for coupling said terminals (K) of each of said crosspoint switching elements to a negative potential with respect to a reference ground potential, second circuit means for selectively coupling the terminals (A) of selected crosspoint switching elements to approximately said reference ground potential, and means for uniquely selecting one of said crosspoint switching elements by coupling a control signal to said terminals (P(−) and P(+)) thereof to thereby establish a unique interconnection between said signal lines.

2. The improvement of claim 1, wherein said second circuit means includes means for selectively coupling said selected terminals (A) to approximately said reference ground potential during selection of said crosspoint switching elements and immediately prior to operation thereof.

3. The improvement of claim 2, wherein said first circuit means includes means for selectively coupling the terminals (K) of said selected crosspoint switching elements to substantially the same reference ground potential as said terminals (A) following operation of said selected crosspoint switching elements.

4. The improvement of claim 1, wherein said plurality of crosspoint switching elements comprises at least two interconnected arrays thereof, and further including means for selecting at least one crosspoint switching element in each array, thereby providing an information signal line path therethrough.

5. The improvement of claim 1, wherein said first circuit means includes means for coupling said terminals (K) to the negative end of a –48 volt source.

6. In a plural stage cross-point switching matrix, each stage including a pnpn semi-conductor device having a cathode terminal for connection to an information signal line and an anode terminal for connection to another information signal line, and a semiconductor gating element having P(–) and P(+) terminals for receiving control signals for selective operation of said pnpn semiconductor element to interconnect said information signal lines, the improvement comprising:

first circuit means for coupling said cathode terminal to a negative potential with respect to a reference ground potential level;

second circuit means for coupling said anode terminal to approximately said reference ground potential level, and control means coupled to said P(–) and P(+) terminals of each said semiconductor device for uniquely selecting said gating element by providing simultaneous control signals thereto to establish a unique interconnection between said signal lines.

7. The improvement of claim 6, wherein said second circuit means includes means for selectively coupling said anode terminal to approximately said reference ground potential level during selection and immediately prior to operation of said pnpn semiconductor element.

8. The improvement of claim 7, wherein said first circuit means includes means for selectively coupling said cathode terminal to substantially the same reference ground potential as said anode terminal following operation of said pnpn semiconductor element.

9. The improvement of claim 6 wherein said first circuit means includes means for coupling said cathode terminal to the negative end of a –48 volt source.

* * * * *